(12) United States Patent
Ishizawa et al.

(10) Patent No.: US 7,339,603 B2
(45) Date of Patent: Mar. 4, 2008

(54) EXPOSURE DEVICE FOR AN ELECTROPHOTOGRAPHIC APPARATUS

(75) Inventors: Katsumi Ishizawa, Ibaraki (JP); Hiroshi Ueno, Ibaraki (JP)

(73) Assignee: Ricoh Printing Systems, Ltd., Tokyo (JP)

(*) Notice: Subject to any disclaimer, the term of this patent is extended or adjusted under 35 U.S.C. 154(b) by 328 days.

(21) Appl. No.: 10/836,194

(22) Filed: May 3, 2004

(65) Prior Publication Data

US 2004/0227808 A1    Nov. 18, 2004

(30) Foreign Application Priority Data

May 16, 2003    (JP)    ............ P. 2003-138623

(51) Int. Cl.
*B41J 27/00*    (2006.01)
(52) U.S. Cl. ................... 347/244; 347/258
(58) Field of Classification Search ........ 347/256–258, 347/131–132, 233–244, 246–255; 359/204, 359/471; 358/1.7, 481, 482, 486, 1.2, 3.07, 358/3.1
See application file for complete search history.

(56) References Cited

U.S. PATENT DOCUMENTS

| 5,262,801 | A | * | 11/1993 | Serizawa | 347/247 |
| 5,489,936 | A | * | 2/1996 | Appel et al. | 347/248 |
| 5,936,755 | A | * | 8/1999 | Inagaki | 359/204 |
| 6,559,875 | B2 | * | 5/2003 | Okano et al. | 347/131 |
| 6,847,390 | B2 | * | 1/2005 | Maeda | 347/250 |
| 2004/0085437 | A1 | * | 5/2004 | Sumi et al. | 347/239 |

FOREIGN PATENT DOCUMENTS

JP    2002-131991    5/2002

\* cited by examiner

*Primary Examiner*—Hai Pham
(74) *Attorney, Agent, or Firm*—McGinn IP Law Group, PLLC

(57) ABSTRACT

An exposure device for an electrophotographic apparatus including one or more laser light sources which expose an image carrier in accordance with a print information signal supplied from an external information processing apparatus, a resolution switching lens, and a switching unit to switch over a low resolution and a high resolution by inserting and extracting the resolution switching lens into and from a laser optical path. Preferably, a light emission time of each of the laser light sources with respect to the print information signal is changeable.

14 Claims, 2 Drawing Sheets

EXPOSURE DEVICE FOR AN ELECTROPHOTOGRAPHIC APPARATUS

BACKGROUND OF THE INVENTION

1. Field of the Invention

The present invention relates to an exposure device for an electrophotographic apparatus, having a laser light source which exposes an image carrier.

2. Background Art

FIG. 2 is a diagram showing a conventional exposure device having a laser light source.

A laser light source 15 is driven by a laser driving circuit 14. The laser driving circuit 14 modulates a laser beam 3 in accordance with a print information signal supplied from an external information processing apparatus. The laser beam 3 is reflected by a rotary polygon mirror 19 which is rapidly rotated in the direction of the arrow b, and, after passed through an F$\theta$ lens 20, scans the surface of a photosensitive drum 1 serving as an image carrier. The surface of the rotated photosensitive drum 1 is repeatedly scanned to form an electrostatic latent image on the surface of the rotated photosensitive drum 1 which is uniformly charged.

In the exposure device, switching between a low resolution and a high resolution is realized by, in accordance with a resolution switch signal supplied from the external information processing apparatus, inserting or extracting a resolution switching lens 22 for switching over beam shapes for resolutions, into or from a laser optical path, and changing a rotational speed signal which is supplied to a rotary polygon mirror driving circuit 18 for driving the rotary polygon mirror 19, where a rotational speed for a high resolution is larger than a rotational speed for a low resolution.

Alternatively, another method is employed in which the laser emission time for a high resolution is made shorter than that for a low resolution, and the laser power is changed so that the exposure amount is optimized (for example, see JP-A-2002-131991).

SUMMARY OF THE INVENTION

However, such conventional methods have a problem in that, when the resolution is switched from a high resolution (for example, 600 dpi) to a low one (for example, 480 dpi), the vertical line width is larger than the lateral line width.

This is caused by the following phenomenon. When the resolution is to be switched from a high resolution to a low one, the resolution switching lens 22 for switching the beam diameter to that for a low resolution is inserted into the optical path. As a result, both the beam diameter in the sub-scanning direction and that in the main scanning direction are increased.

The theoretical exposure time T for printing one dot is given by Ex. (1):

$$T = (1\text{-dot exposure time for 600 dpi}) \times (600/480) \quad (1)$$

When, in order to print one dot, laser emission is conducted only for the time T under this condition, the exposure distance in the main scanning direction is larger than that in the sub-scanning direction because also the beam diameter in the main scanning direction is increased as described above. In a resulting latent image, therefore, the dot has a laterally elongated shape. When the resolution is switched from a high resolution to a low one, consequently, the vertical line width is larger than the lateral line width (see FIG. 4).

It is an object of the invention to provide an exposure device for an electrophotographic apparatus in which the printing quality is not affected by switching of the resolution, and hence the printing quality can be stably obtained.

In order to solve the problem, the invention provides an exposure device for an electrophotographic apparatus including one or more laser light sources which expose an image carrier in accordance with a print information signal supplied from an external information processing apparatus, a resolution switching lens, and a switching unit to switch over a low resolution and a high resolution by inserting and extracting the resolution switching lens into and from a laser optical path. Preferably, a light emission time of each of the laser light sources with respect to the print information signal is changeable

BRIEF DESCRIPTION OF THE DRAWINGS

The present invention may be more readily described with reference to the accompanying drawings.

DETAILED DESCRIPTION OF THE PREFERRED EMBODIMENTS

Figure 1:
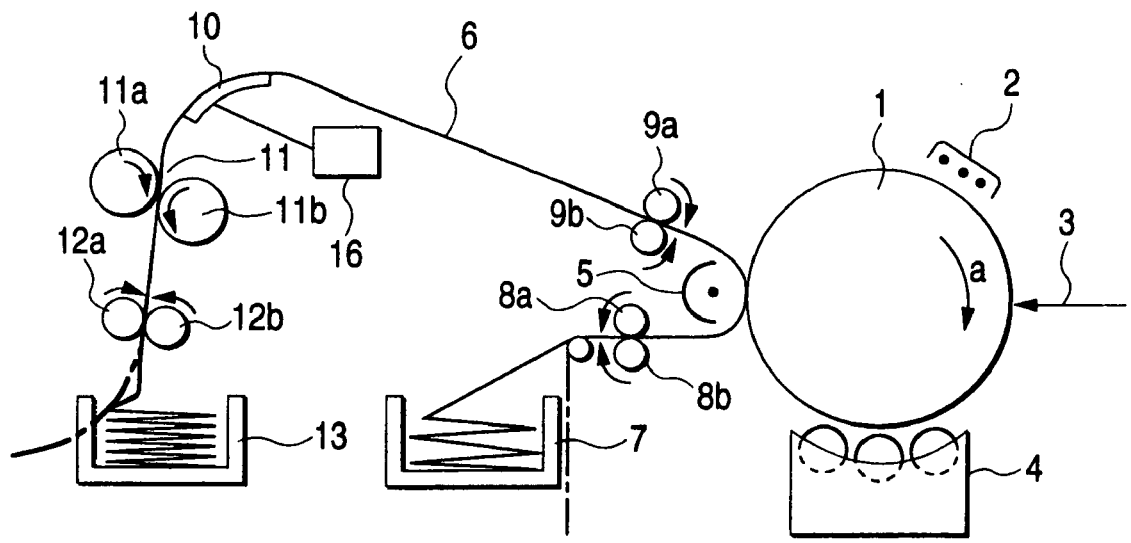
FIG. 1 is a diagram showing the whole configuration of an electrophotographic apparatus.
Figure 2:
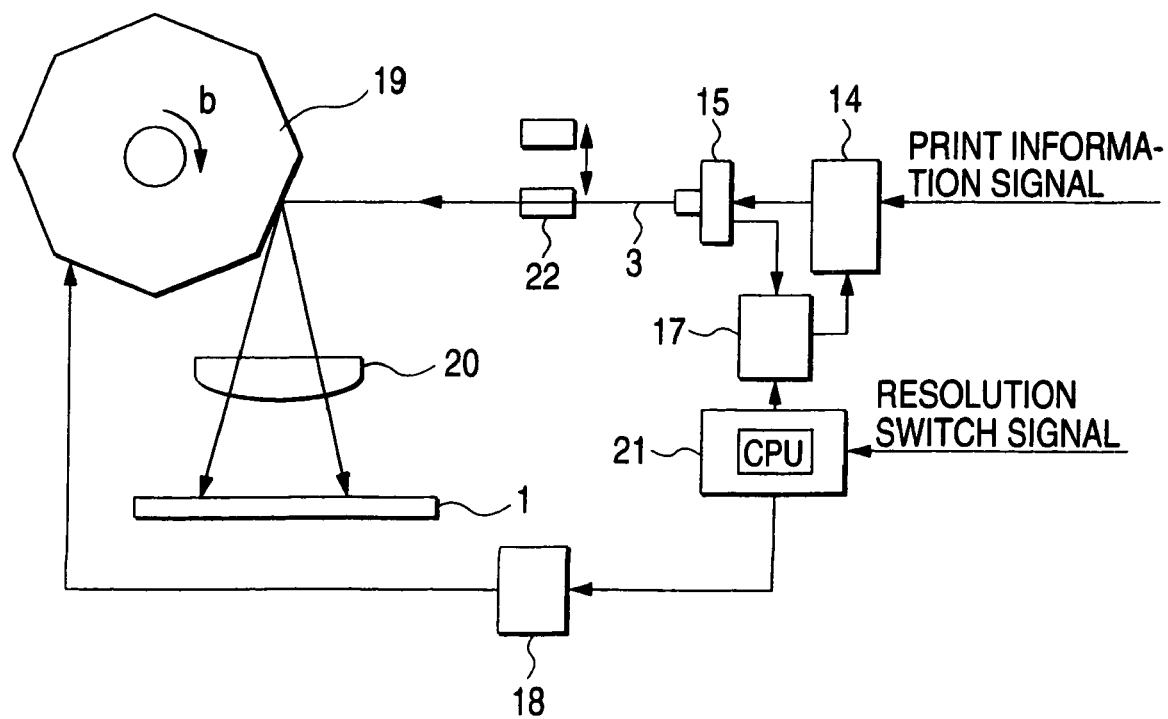
FIG. 2 is a block diagram of a control system of a conventional exposure device.

Referring to FIG. 1, 1 denotes a photosensitive drum on which a toner image is to be formed by an electrophotographic process, and which is supported by a shaft so as to be rotated at a constant speed in the direction of the arrow a. A charging device 2 is placed so as to be opposed to the surface of the photosensitive drum 1, and uniformly charges the surface of the photosensitive drum 1 which is passed so as to be opposed to the charging device 2. A laser beam 3 which is modulated in accordance with a print information signal supplied from an information processing apparatus exposes the surface of the photosensitive drum 1 which is uniformly charged, to form an electrostatic latent image on the surface of the photosensitive drum 1. A developing device 4 is placed so as to be opposed to the surface of the photosensitive drum 1 in which the electrostatic latent image is formed. The developing device 4 has a developing function in which a powdery toner is caused to adhere to the surface of the photosensitive drum 1 by an electrostatic force of the electrostatic latent image, thereby forming a toner image. A sheet hopper 7 houses a folded continuous belt-like recording member (print sheet) 6 on to which the toner image is to be transferred and fixed, thereby printing the image. Transport rollers 8a, 8b which constitute a part of a print sheet transporting unit take in the print sheet 6 from the hopper 7, and feed the sheet toward the photosensitive drum 1. The print sheet 6 which is fed by the transport rollers 8a, 8b is in contact with the surface of the photosensitive drum 1 to enable the toner image to be transferred to the surface of the sheet. A transferring device 5 generates an electrostatic force for moving (transferring) the toner image to the surface the print sheet 6, in the back face of the print sheet 6 which is in contact with the surface of the photosensitive drum 1. Transport rollers 9a, 9b which constitute another part of the print sheet transporting unit feed the print sheet 6 onto which the toner image has been transferred, to a preheater 10. The preheater 10 is disposed at a position in front of fixing rollers 11, and in contact with the rear face of the print sheet 6 carrying the toner image to preliminarily heat the print sheet 6. The preheater 10 has a configuration in which, for example, an electric heater is attached to the rear face of a heat transfer member with which the rear face of the print sheet 6 is to be in contact. During a period when the print sheet 6 is moved while being contacted with the surface of the preheater 10, the preheater heats the print sheet 6 to a degree at which the toner image adhering to the print sheet 6 is softened. The temperature of the preheater 10 is adjusted by controlling a current supplied to the electric heater by a temperature controller 16. The fixing rollers 11 consisting of a pair of a heating roller 11a and a pressure roller 11b which is in press contact with the heating roller 11a heat and press the print sheet 6 which has been preliminarily heated as a result of the contact with the preheater 10, thereby fixing the toner image to the surface of the print sheet 6. Puller rollers 12a, 12b pull the print sheet 6 sent out by the fixing rollers 11 to house the sheet into a stacker 13 in a folded manner, or to discharge the sheet to the outside of the apparatus so as to be sent to a second electrophotographic apparatus or a postprocessor (not shown) which is placed in the subsequent stage.

Figure 3:
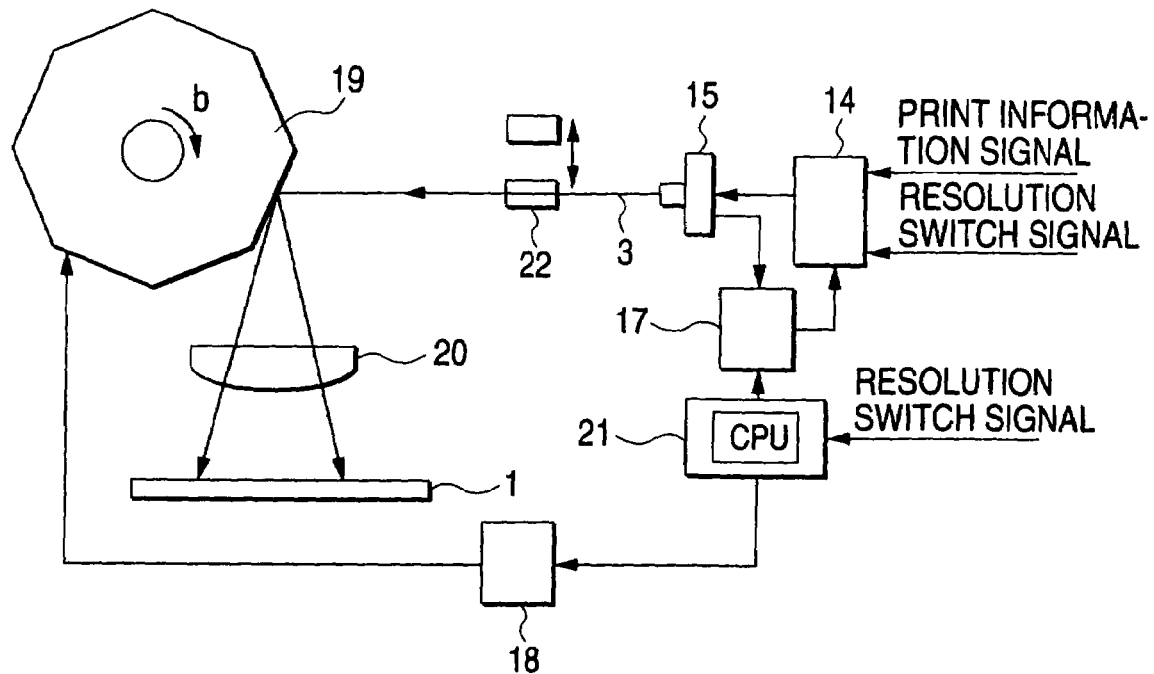
FIG. 3 is a block diagram of a control system of the exposure device of the invention.
Figure 4:
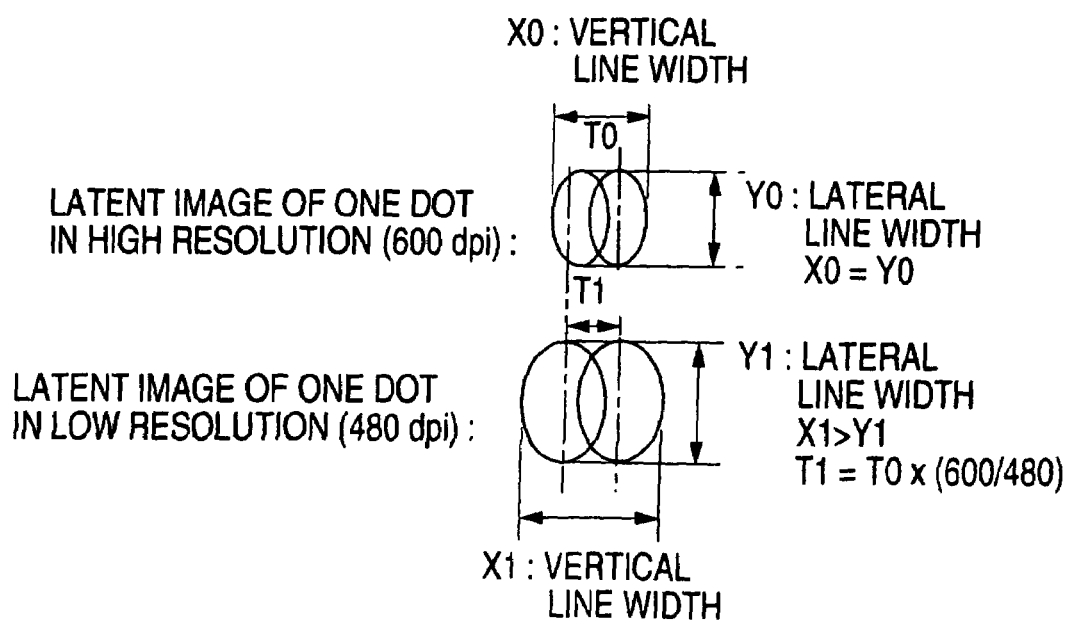
FIG. 4 is a view showing latent images in printing of one dot at a low resolution in a conventional art.

An embodiment of the invention will be described with reference to FIG. 3.

A laser light source 15 is driven by a laser driving circuit 14. The laser driving circuit 14 modulates the laser beam 3 in accordance with a print information signal supplied from the external information processing apparatus. The laser beam 3 is reflected by a rotary polygon mirror 19 which is rapidly rotated in the direction of the arrow b, and after passed through an Fθ lens 20, scans the surface of the photosensitive drum 1 serving as an image carrier. The surface of the rotated photosensitive drum 1 is repeatedly scanned to form an electrostatic latent image on the surface of the rotated photosensitive drum 1 which is uniformly charged.

In the exposure device, in accordance with a resolution switch signal supplied from the external information processing apparatus, the rotational speed of the rotary polygon mirror 19 is changed, and in accordance with the resolution switch signal which is further supplied to the laser driving circuit 14, the laser beam 3 is modulated so that the laser emission time with respect to the print information signal is shortened by a constant time for each of the resolutions.

A time which enables the lateral and vertical line widths of the beam spot to be equal to each other before and after the change of the resolution is previously obtained. The value of the time is stored in a storage unit. The stored value is used.

According to the embodiment, even in the configuration which uses a resolution switching lens 22 for switching over beam shapes for respective resolutions in accordance with the resolution switch signal supplied from the external information processing apparatus, the lateral and vertical line widths of one dot in printing can be made equal to each other.

According to the configuration, it is possible to provide a laser light source device for an electrophotographic apparatus in which the amount of exposure on the image carrier can be optimized without being affected by the resolution and hence an excellent printing quality can be obtained.

As described above, the invention can provide an exposure device for an electrophotographic apparatus in which, when the resolution is to be switched over, the laser emission time with respect to a print information signal supplied from an external information processing apparatus is adequately changed, whereby the amount of exposure on the image carrier can be optimized and hence an excellent printing quality can be obtained.

What is claimed is:

1. An exposure device for an electrophotographic apparatus comprising:
   one or more laser light sources which expose an image carrier in accordance with a print information signal supplied from an external information processing apparatus;
   a resolution switching lens; and
   a switching unit to switch between a low resolution and a high resolution of an image to be formed by inserting and extracting the resolution switching lens into and from a laser optical path,
   wherein a light emission time of each of the laser light sources with respect to a resolution of the print information signal is changeable, and
   wherein the light emission time of the laser light source with respect to the print information signal is set to a value by which vertical and lateral widths of each latent image dot on said image carrier are equal to each other.

2. The apparatus of claim 1, wherein the light emission time is extended when the resolution is decreased.

3. The apparatus of claim 1, wherein the light emission time is shortened by a constant time for each increase in resolution.

4. The apparatus of claim 1, further comprising a storage unit that stores the light emission time.

5. The apparatus of claim 4, wherein the storage unit stores a plurality of light emission times, and wherein each of said plurality of light emission times corresponds to one of a plurality of resolutions.

6. An exposure device, comprising:
   a light source for exposing an image carrier; and
   a switching unit that switches between resolutions, wherein said light source has a first light emission time for a first resolution and a second light emission time for a second resolution, which is different from said first resolution, and wherein at least one of the first light emission time and said second light emission time of the laser light source with respect to the print information signal is set to a value by which vertical and lateral widths of each latent image dot on said image carrier are equal to each other.

7. The device of claim 6, further comprising a resolution switching lens that is movable into and out of a light path from said light source based upon said switching between resolutions.

8. The device of claim 6, wherein the first light emission time is longer than said second light emission time.

9. The device of claim 8, wherein said first resolution is less than said second resolution.

10. The device of claim 6, further comprising a third light emission time for a third resolution, and wherein the difference between the first light emission time and the second light emission time is substantially the same as the difference between the second light emission time and the third light emission time.

11. The device of claim 6, further comprising a storage unit that stores said first and second light emission times.

12. The device of claim 11, wherein the storage unit stores a plurality of light emission times that includes said first and second light emission times, and wherein each of said plurality of light emission times corresponds to one of a plurality of resolutions.

13. An exposure device for an electrophotographic apparatus comprising:
    means for exposing an image carrier in accordance with a print information signal supplied from an external information processing apparatus; and
    means for switching between a low resolution and a high resolution of an image to be formed by inserting and extracting a resolution switching lens into and from a laser optical path, wherein a light emission time for said means for exposing is changeable with respect to a resolution of the print information signal, and
    wherein the light emission time of the means for exposing is set to a value by which vertical and lateral widths of each latent image dot on said image carrier are equal to each other.

14. A method for exposing an image carrier for an electrophotographic apparatus, the method comprising:
    exposing the image carrier in accordance with a print information signal supplied from an external information processing apparatus; and
    switching between a low resolution and a high resolution of an image to be formed by inserting and extracting a resolution switching lens into and from a laser optical path, wherein a light emission time of said exposing is changeable with respect to a resolution of the print information signal,
    wherein the light emission time of said exposing is set to a value by which vertical and lateral widths of each latent image dot on the image carrier are equal to each other.

* * * * *